(12) United States Patent
Huang (10) Patent No.: US 10,942,301 B2
(45) Date of Patent: Mar. 9, 2021

(54) OPTICAL FUNCTION PANEL WITH AT LEAST ONE FUNCTIONAL LAYER WITH PARTICLES

(71) Applicant: Min Huang, GuangDong (CN)

(72) Inventor: Min Huang, GuangDong (CN)

(73) Assignee: HuiZhou Changed New Materials Co., Ltd, HuiZhou (CN)

( * ) Notice: Subject to any disclaimer, the term of this patent is extended or adjusted under 35 U.S.C. 154(b) by 146 days.

(21) Appl. No.: 16/197,362

(22) Filed: Nov. 21, 2018

(65) Prior Publication Data

US 2020/0158924 A1    May 21, 2020

(51) Int. Cl.
    *G02B 5/02*          (2006.01)
    *G02B 1/115*       (2015.01)
    *G02F 1/13357*    (2006.01)

(52) U.S. Cl.
CPC ............ *G02B 5/0278* (2013.01); *G02B 1/115* (2013.01); *G02B 5/0242* (2013.01); *G02F 1/133606* (2013.01); *G02F 1/133611* (2013.01)

(58) Field of Classification Search
CPC .......... G02B 1/00; G02B 5/02; G02B 5/0205; G02B 5/021; G02B 5/0215; G02B 5/0221; G02B 5/0226; G02B 5/0231; G02B 5/0236; G02B 5/0242; G02B 5/0257; G02B 5/0263; G02B 5/0273; G02B 5/0278; G02B 5/0294; G02B 5/0268; G02B 6/0001; G02B 6/0011; G02B 6/0013; G02B 6/0015; G02B 6/0016; G02B 6/0025; G02B 6/0033; G02B 6/0035; G02B 6/0036; G02B 6/004; G02B 6/0041; G02B 6/0043; G02B 6/005; G02B 6/0051; G02B 6/0053; G02B 6/0065
USPC ........ 359/599, 601, 609, 614; 362/600, 602, 362/604, 605, 606, 607, 615, 617, 618, 362/619, 620, 621, 622, 623, 624, 625, 362/626, 627, 628, 629
See application file for complete search history.

(56) References Cited

U.S. PATENT DOCUMENTS

2010/0052195 A1*   3/2010   Chang ................. G02B 5/0278
                                                                           264/1.7
2019/0146126 A1*   5/2019   Nirmal ................ B32B 27/308
                                                                            359/599

* cited by examiner

*Primary Examiner* — Arnel C Lavarias (57) ABSTRACT

An optical function panel having a main body comprises a main layer and at least a functional layer combined with main layer, wherein the main layer is thicker than functional layer, and the main layer is composed of a transparent material, the main layer and functional layer are formed by co-extrusion in an extruder, and are formed with regular or irregular salient structures on an upper or/and a lower surface of the main body. The thicknesses of main layer and functional layer and formulae or additives can be adjusted flexibly. The brightness can be increased by the serrated structures on the upper surface of main body while the concealing property is invariant; and the main layer and functional layer are independent of the absolute influence of formulae or additives on the transmittance property of diffuser plate.

2 Claims, 7 Drawing Sheets

OPTICAL FUNCTION PANEL WITH AT LEAST ONE FUNCTIONAL LAYER WITH PARTICLES

BACKGROUND OF INVENTION

1. Field of the Invention

The present invention relates generally to the domain of optical function panel technology, and more particularly to an optical function panel with multilayer structure.

2. Description of Related Art

Figure 1:
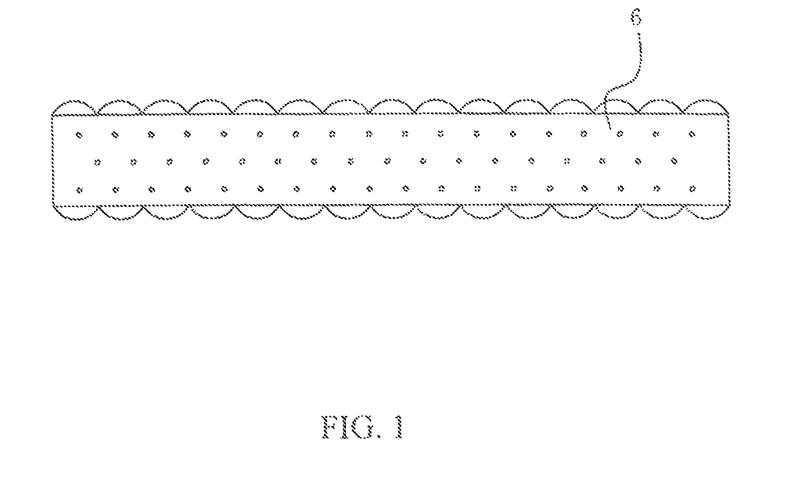
FIG. 1 is a structural representation of conventional optical function panel.

The application of optical function panel began since the 1930s, the optical function panel has been used in the domains of optical and optoelectronics techniques extensively to fabricate different optical instruments in modern times. The diffuser plate is a sort of optical function panel. The major characteristic of diffuser plate is strong interference in light. Whatever the degree of the originally designed light distribution curve is, the diffuser plate changes the light beam angle to 160~176°, so looking from the side, the plate of lamp is foggy, proving the light beam angle is 160~176°. The larger the light beam angle is, the lower is the illuminance, and there is filtering in some cases, so that a part of wavelengths cannot penetrate, inducing color cast. If the surface is treated by another light interference (e.g. dull polish, embossing), the transmittance property is lower for the natural phenomenon of geometrical optics. Therefore, the lower the refractive index of the substrate for fabricating diffuser plate is, the weaker is the interference in light. As shown in FIG. 1, the conventional diffuser plate 6 is usually made by mixing one material (e.g. PS polystyrene plastics) with formulae or additives uniformly, and then the mixture is molten and extruded by mold, it is a function panel of single-layer structure.

The optical function panel is usually used in the back light module structure, and extensively used in the domains of optical and optoelectronics techniques to fabricate different optical instruments. The conventional optical function panel is made by mixing one material (e.g. PS) with formulae or additives uniformly, and then the mixture is molten and extruded by mold. The formulae or additives have a radical effect on the optical transmittance property and haze (concealing property) of end product. Generally, the diffuser plate for direct back light is used with optical films (diffusion barrier, brightness enhancement film), so as to enhance the brightness or uniformity. In addition, the back light assembly requires considerable service positions and direct operators.

As the formulae or additives used in optical function panel have a radical effect on the optical transmittance property and haze (concealing property) of end product, the transmittance property is reduced to some extent if the concealing property is enhanced, the concealing property is lost to some extent if the transmittance property is enhanced.

In order to overcome the above problems, the following technical proposals are proposed after continuous research and development of the present invention.

SUMMARY OF THE INVENTION

The technical problem to be solved by the present invention is to overcome the deficiencies of the prior art, and to provide an optical function panel which can be applied to a backlight module and can have both light transmission and concealing properties.

In order to solve the above technical problems, the present invention adopts the following technical solutions:

An optical function panel having a main body comprising: a main layer and at least a functional layer combined with main layer, wherein the main layer is thicker than functional layer, and the main layer is composed of a transparent material, the main layer and functional layer are formed by co-extrusion in an extruder, and are formed with regular or irregular salient structures on an upper or/and a lower surface of the main body.

More particularly, wherein the upper surface of the main body is bonded to an optical film layer through a UV adhesive layer.

More particularly, wherein the functional layer is provided as a layer, the functional layer is disposed above the body layer or the functional layer is disposed below the body layer.

More particularly, wherein the functional layer is provided with two layers respectively disposed on the upper surface and the lower surface of the main body layer, and the two functional layers are formed of the same or different materials.

More particularly, wherein the optical film layer is one or some of diffusion barrier, brightness enhancement film, complex film or optical film bonding products.

More particularly, wherein the main body layer is a thin layer made of a colorless transparent plastic material and is made of one of PMMA, PS, PC, PP or a corresponding copolymer thereof.

More particularly, wherein the basic material of functional layer is plastic particles at lower melting point, such as PMMA, PS, PC, PP or the corresponding copolymer, one or some of such formulae or functional additives as diffusant/particles, ultraviolet absorbent/particles, brightener and anti-yellowing agent are combined by physical or chemical means, molten to form a thin layer by in-mold extrusion.

More particularly, wherein the main layer has a thickness greater than 0.3 mm, and the functional layer has a thickness of less than 100 μm.

More particularly, wherein the salient structures are serrated or semicircular or arc bulges in cross section; the serrated or semicircular or arc bulges are distributed uniformly on the upper surface and/or lower surface of main body.

Compared with the existing technology, the present invention has the following effects:

The optical function panel of the present invention uses multilayer structure. The main body comprises a main layer and at least a functional layer. The main layer and functional layer are made of the same or different materials. The thickness of main layer and functional layer and the formulae or additives can be adjusted flexibly. The brightness can be increased by the serrated structures on the upper surface of main body while the concealing property is invariant; and the main layer and functional layer are independent of the absolute influence of formulae or additives on the transmittance property/haze of diffuser plate.

The present invention can add an optical film layer to a main body, which can be used in back light module to increase the packaging efficiency of back light module, and the thickness of back light module is reduced, the cost is reduced to some extent.

The present invention will not degrade the transmittance property to some extent while enhancing the concealing property, and will not sacrifice the concealing property to a certain extent while enhancing the transmittance properly, it is more applicable to back light and lighting products.

DETAILED DESCRIPTION OF THE INVENTION

The present invention is further described below with embodiments and attached figures.

Embodiment 1

Figure 2:
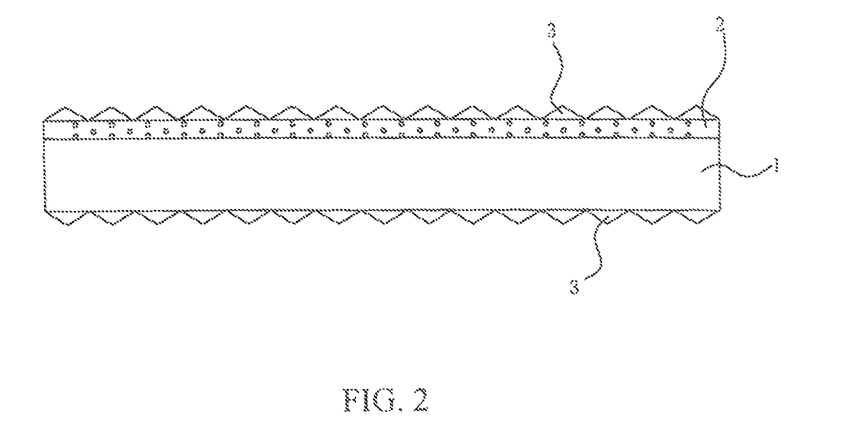
FIG. 2 is the schematic diagram of the first kind of structure of optical function panel in Embodiment 1 of the present invention.

As shown in FIG. 2, the optical function panel in the Embodiment 1 has a main body, the main body comprises a main layer 1 and a functional layer 2 combined with main layer 1. The main layer 1 is thicker than functional layer 2. Generally, the thickness of main layer 1 is larger than 0.3 m, and the thickness of functional layer 2 is smaller than 100 μm. This embodiment uses main layer 1 in thickness of 0.4 mm and functional layer 2 in thickness of 90 μm.

The main layer 1 and functional layer 2 are made by in-mold coextrusion of extruders, two extruders are required to work simultaneously. The main layer 1 and functional layer 2 are made of different materials. The main layer 1 is a thin layer made of colorless transparent plastic material. To be specific, the main layer 1 is made of one of PMMA (polymethyl methacrylate acrylic), PS (polystyrene), PC (polycarbonate), PP (polypropylene) and the corresponding copolymer. Said functional layer 2 is made of plastic materials with good adhesion and high transmittance property. The basic material of functional layer 2 is plastic particles at lower melting point, such as PMMA, PS, PC, PP or the corresponding copolymer, one or several kinds of such formulae or functional additives as diffusant/particles, ultraviolet absorbent/particles, brightener and anti-yellowing agent are combined by physical or chemical means, molten to form a thin layer by in-mold extrusion.

The main layer 1 is made of one material, the finished main body can enhance the concealing property of function panel without sacrificing the transmittance property. The main layer 1 is colorless and transparent and free of any formulae or additives, the obtainable maximum transmittance property of material is preferred. This embodiment uses single PMMA material. The basic material of functional layer 2 is PS, the diffusant/particles, ultraviolet absorbent/particles, brightener and anti-yellowing agent are combined by physical or chemical means, and molten to form a thin layer by in-mold extrusion, the haze or concealing property is enhanced. The thicknesses of main layer 1 and functional layer 2 can be adjusted flexibly as required.

Figure 3:
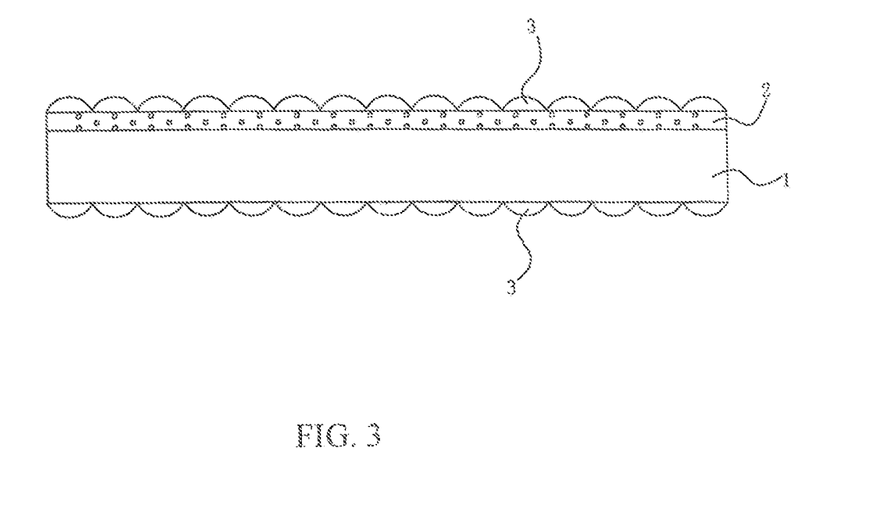
FIG. 3 is a schematic diagram of the second kind of structure of optical function panel in Embodiment 1 of the present invention.
Figure 4:
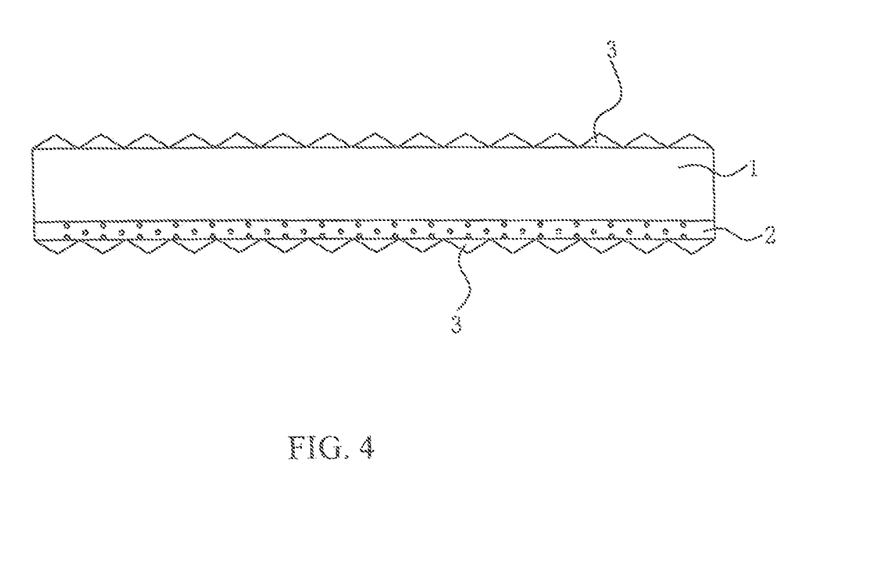
FIG. 4 is a schematic diagram of the third kind of structure of optical function panel in Embodiment 1 of the present invention.

As shown in FIGS. 2 and 3, the functional layer 2 can be located above main layer 1; or as shown in FIGS. 3 and 4, said functional layer 2 can be located below main layer 1. There are regular or irregular salient structures 3 on the upper surface or/and lower surface of the finished main body.

Figure 5:
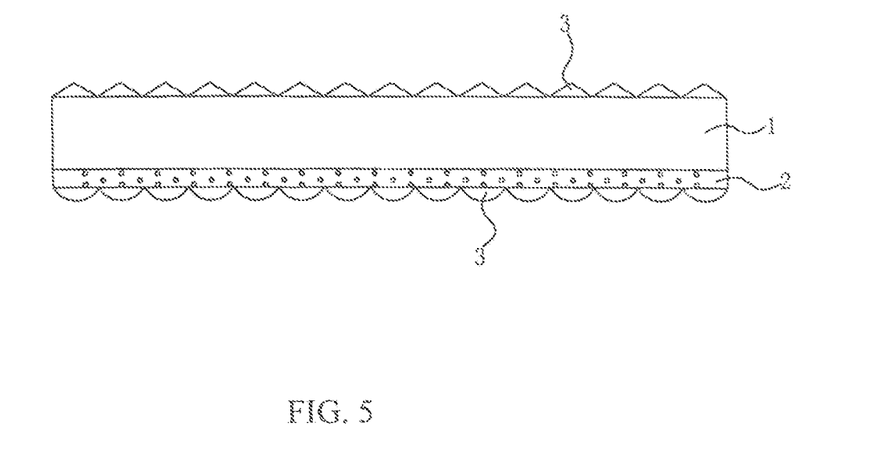
FIG. 5 is a schematic diagram of the fourth kind of structure of optical function panel in Embodiment 1 of the present invention.

As shown in FIGS. 2-5, the preferred implementation method of this embodiment is that the upper and lower surfaces of main body are provided with salient structures 3. The salient structures 3 are serrated (as shown in FIGS. 2 and 4) or semicircular or arc bulges (as shown in FIG. 3) in cross section, or the upper and lower surfaces of main body are provided with serrated salient structures and semicircular salient structures respectively (as shown in FIG. 5). Whatever the salient structures are, the serrated or semicircular or arc bulges are distributed uniformly on the upper surface and lower surface of main body.

As shown in FIGS. 2 and 3, when the functional layer 2 is located above main layer 1, the largest scattering/refraction region after the light passes through main body concentrates in the functional layer 2, the light scattering path region is shortened. For the effect of diffusion particles, the degree of light mixing within a short distance is higher, and the concealing property is enhanced relatively.

As shown in FIGS. 4 and 5, when the functional layer 2 is located below main layer 1, the light is transmitted through the colorless and transparent Layer 1, the surface serrations or semicircles or arcs gather light to some extent, the front brightness is enhanced. The largest scattering/refraction region after the light passes through the main body concentrates in the functional layer 2, the light scattering path region is shortened, and under the effect of diffusion particles, the degree of light mixing within a short distance is higher, the concealing property is enhanced relatively.

Embodiment 2

Figure 6:
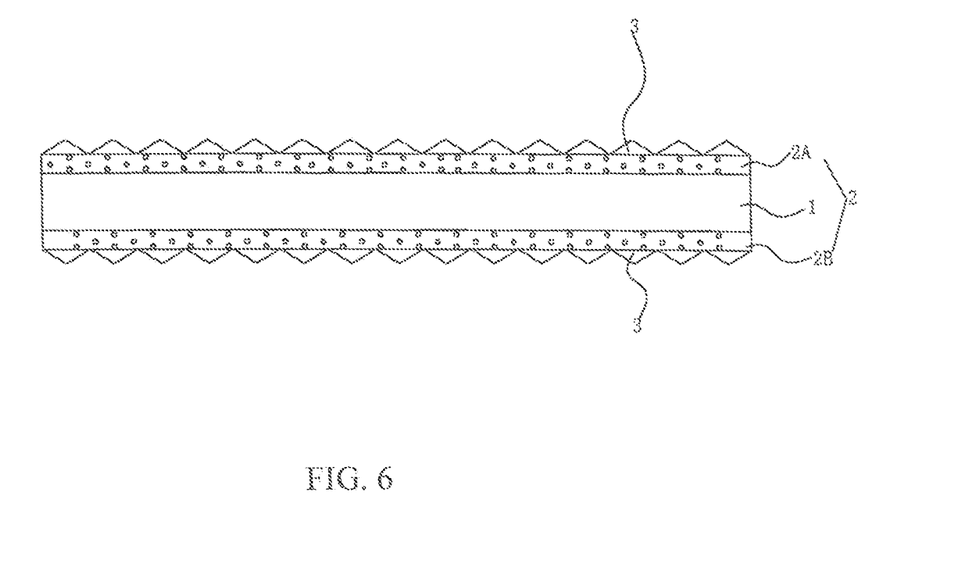
FIG. 6 is a schematic diagram of the first kind of structure of optical function panel in Embodiment 2 of the present invention.
Figure 7:
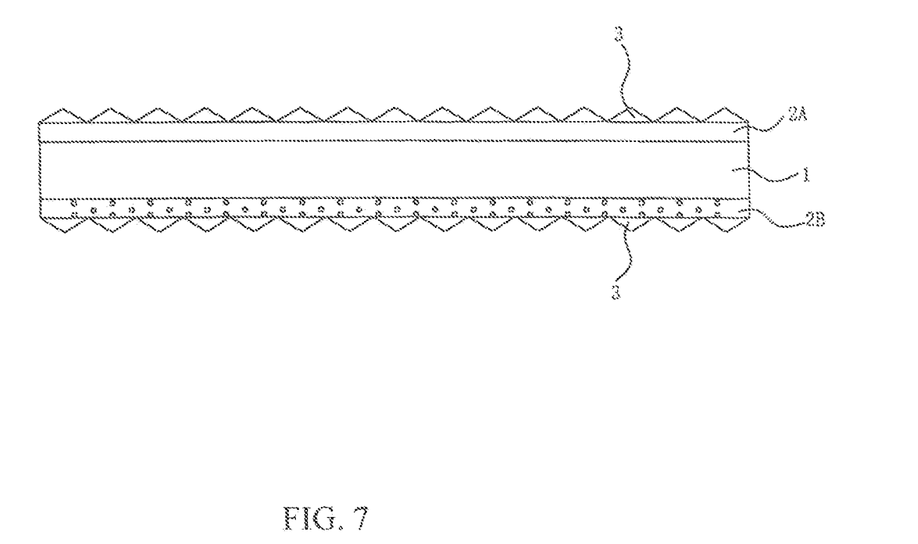
FIG. 7 is a schematic diagram of the second kind of structure of optical function panel in Embodiment 2 of the present invention.
Figure 8:
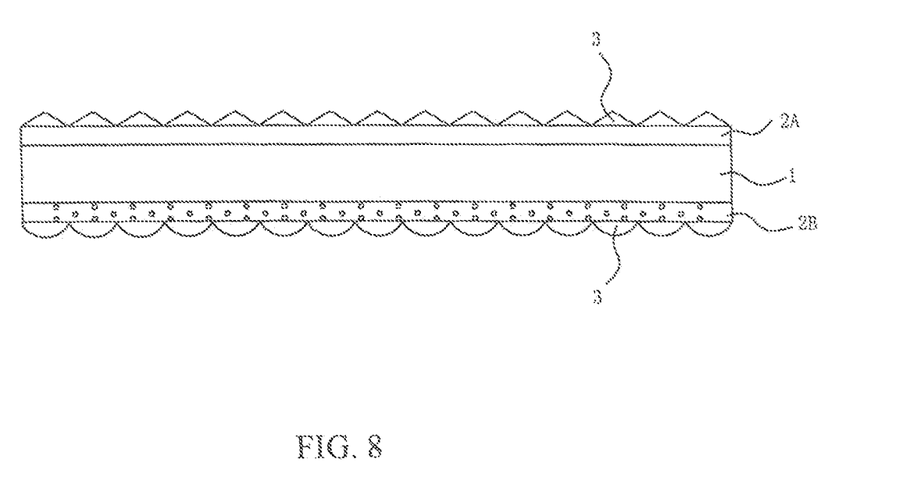
FIG. 8 is a schematic diagram of the third kind of structure of optical function panel in Embodiment 2 of the present invention.

As shown in FIGS. 6-8, combined with the foregoing statement, the difference between the Embodiment 2 and Embodiment 1 is that the embodiment 2 has two functional layers, which are functional layer 2A and functional layer 2B. The main layer 1 is sandwiched in between the two functional layers 2. The main layer 1, functional layer 2A and functional layer 2B are made by in-mold coextrusion of three extruders.

The main layer 1 uses one material, the main layer 1 is colorless, transparent and free of any formulae or additives, the obtainable maximum transmittance property of material is preferred. The main layer 1 herein is made of simple PS material. The basic material of functional layer 2A and functional layer 2B is PMMA, the diffusant/particles and brightener are combined by physical or chemical means, molten to form a thin layer by in-mold extrusion, the haze or concealing property is enhanced. The two functional layers 2 can be made of the same or different materials. In addition, the functional layer 2 can use or not use functional additives, the use of additives aims to enhance the concealing property. The upper and lower surfaces of main body are provided with salient structures 3. The salient structures 3 are serrated or semicircular or arc bulges in cross section, the serrated or semicircular or arc bulges are distributed uniformly on the upper surface and/or lower surface of main body.

FIG. 6 shows the first structure form used by the Embodiment 2, the upper and lower surfaces of main body are provided with serrated salient structures 3, and the two functional layers 2 in FIG. 6 used functional additive 3, the concealing effect is better.

FIGS. 7-8 show the second and the third structure form used by the Embodiment 2. The upper surface of main body is provided with serrated salient structures 3, and there are serrated or semicircular salient structures 3 formed rotationally on the lower surface according to actual requirement. In FIGS. 7-8, the functional layer 2A located above main layer 1 is only made of basic material PMMA, it is free of functional additives. The functional layer 2B located below main layer 1 used functional additives, the PMMA is combined with diffusant/particles and brightener. In terms of concealing effect, the product in FIG. 6 has better concealing effect.

The functional layer 2A is free of functional additives, the serrated salient structures 3 on its surface can gather light, the front brightness of optical function panel is increased. The lower surface of functional layer 2B is provided with salient structures, the losses resulted from the lower surface reflected light can be reduced. After the light passes through the main body, the largest scattering/refraction region concentrates in functional layer 2B, the light scattering path region is shortened, and under the effect of diffusion particles, the degree of light mixing within a short distance is higher, the concealing property is enhanced relatively.

Embodiment 3

Figure 9:
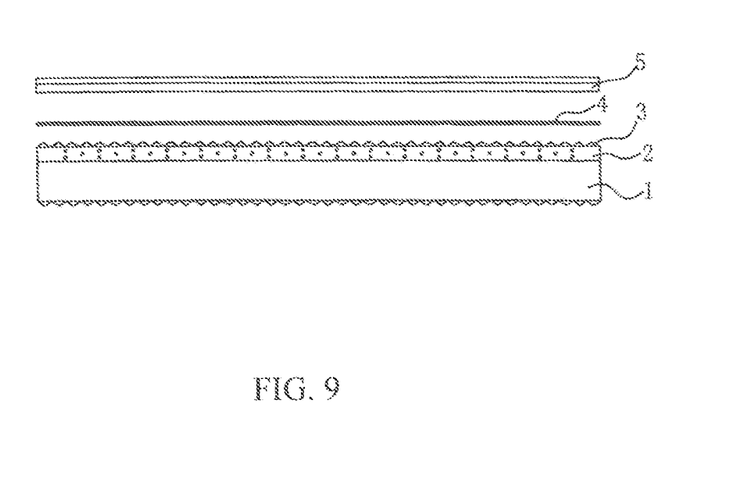
FIG. 9 is a schematic diagram of the first kind of structure of optical function panel in Embodiment 3 of the present invention.
Figure 10:
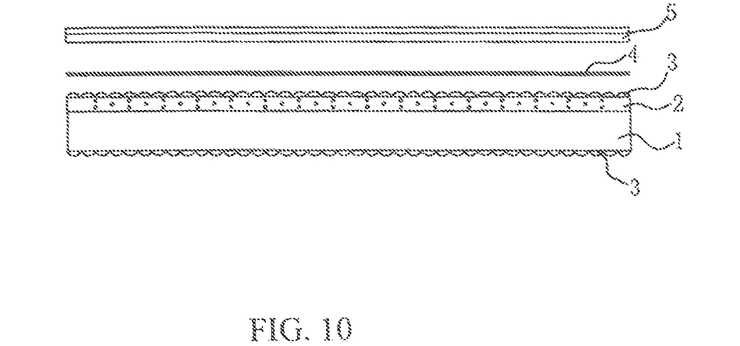
FIG. 10 is a schematic diagram of the second kind of structure of optical function panel in Embodiment 3 of the present invention.
Figure 11:
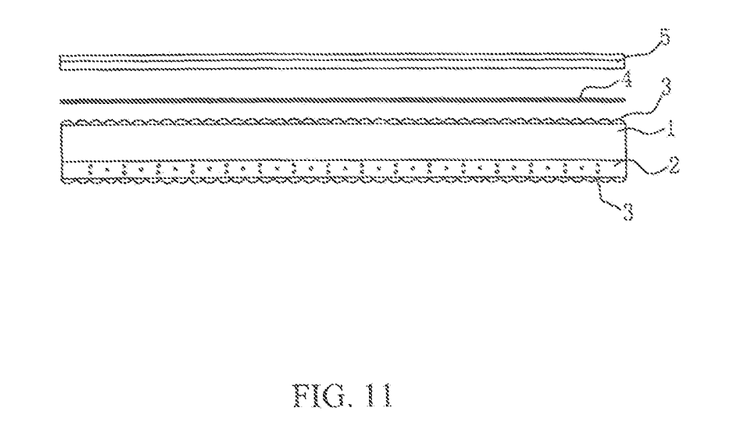
FIG. 11 is a schematic diagram of the third kind of structure of optical function panel in Embodiment 3 of the present invention.

As shown in FIGS. 9-11, the difference between this embodiment and Embodiment 1 is that an optical film layer 5 is stuck on the upper surface of main body in Embodiment 3 by UV adhesive layer 4. The optical film layer 5 is one or some of diffusion barrier, brightness enhancement film, complex film and optical film bonding products. The diffusion barrier is selected here, and the UV adhesive layer 4 is a colorless and transparent adhesive layer.

The functional layer 2 can be located above main layer 1 and below main layer 1.

The main layer 1 and functional layer 2 are made by in-mold coextrusion, more than two extruders are required to work simultaneously, the main layer 1 and functional layer 2 are made of different materials. The thickness of functional layer 2 is generally smaller than 100 μm, it is set as 90 μm in this embodiment. The basic material of functional layer 2 is plastic particles at lower melting point, e.g. PMMA, PS, PC, PP or the corresponding copolymer. The modified particles are used in general, one or some of such formulae or functional additives as diffusant/particles, ultraviolet absorbent/particles, brightener and anti-yellowing agent are combined by physical or chemical means, and molten to form a thin layer by in-mold extrusion, the haze or concealing property is enhanced. The thickness of main layer 1 is generally larger than 0.41 mm it is set as 5 mm in this embodiment. The main layer 1 usually uses simple plastic particles, such as PS, PP, PMMA, PC and their copolymers, which are colorless and transparent and free of any formulae or additives, the obtainable maximum transmittance property of material is preferred.

The materials of the aforesaid main layer 1 and functional layer 2 can be changed according to specific conditions, so as to facilitate subsequent processing of surface salient structures 3. The upper and lower surfaces of main body after in-mold coextrusion are basically smooth, the salient structures 13 shall be made on the upper surface and/or lower surface of main body. In this embodiment, the salient structures 13 are made on the upper surface and lower surface of main body, the salient structures 3 are serrated or semicircular or arc bulges in cross section. The serrated or semicircular or arc bulges are distributed uniformly on the upper surface and lower surface of main body.

The function panel of this embodiment is applicable to optical module structure. After the light passes through the diffuser plate, the largest scattering/refraction region concentrates in functional layer 2, the light scattering path region is shortened, and under the effect of diffusion particles, the degree of light mixing within a short distance is higher, the concealing property is enhanced relatively. The aforesaid structure can increase the back light packaging efficiency, the transmittance can be enhanced appropriately while the concealing effect is implemented, the optical loss after bonding is reduced, so that the optical performance approximates conventional method, promoting mechanical assembly of back light, one-stop operation, and the total thickness of substrate board is reduced appropriately, the cost is reduced to a certain extent, it is extensively used in back light and lighting products.

Embodiment 4

Figure 12:
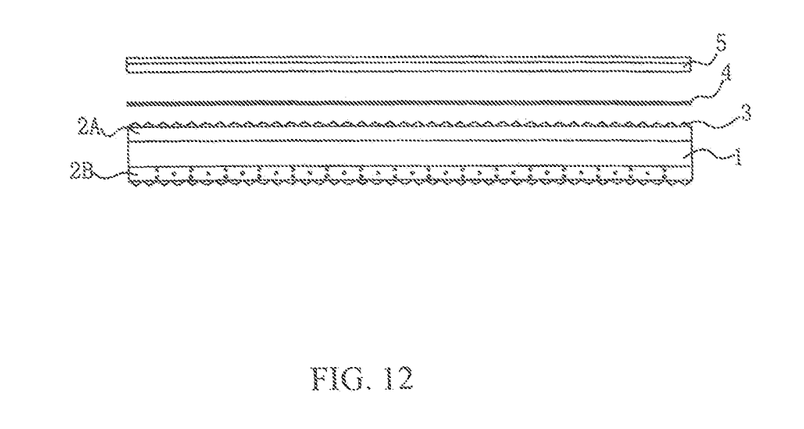
FIG. 12 is a schematic diagram of the first kind of structure of optical function panel in Embodiment 4 of the present invention.
Figure 13:
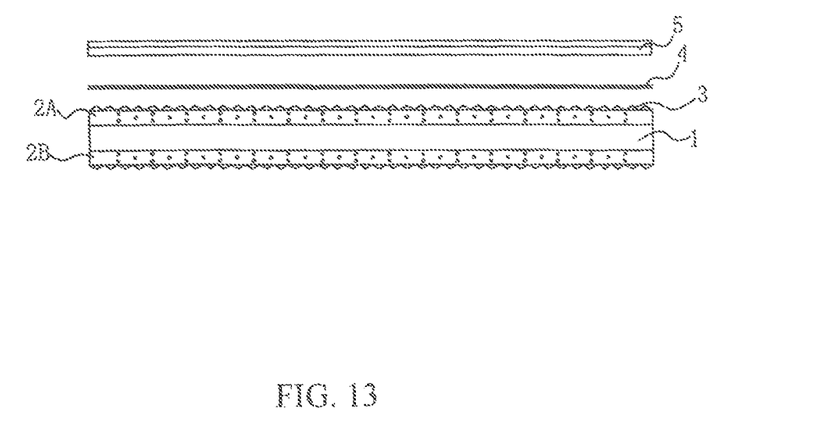
FIG. 13 is a schematic diagram of the second kind of structure of optical function panel in Embodiment 4 of the present invention.
Figure 14:
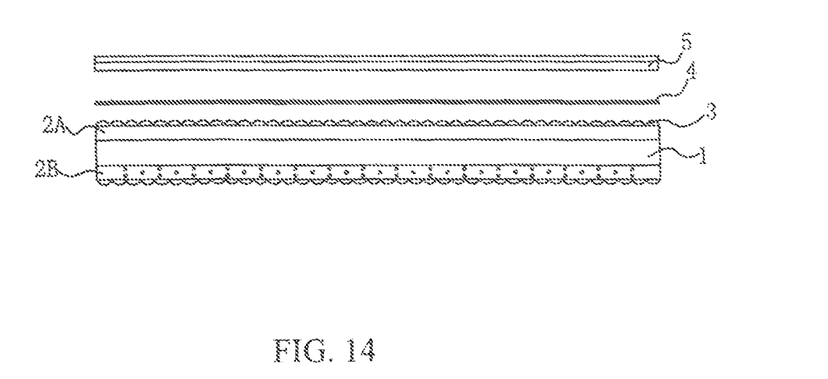
FIG. 14 is a schematic diagram of the third kind of structure of optical function panel in Embodiment 4 of the present invention.

The difference between this embodiment and Embodiment 4 is that an optical film layer 5 is stuck on the upper surface of main body in Embodiment 4 by UV adhesive layer 4. The optical film layer 5 is one or some of diffusion barrier, brightness enhancement film, complex film and optical film bonding products. The diffusion barrier is selected here, and the UV adhesive layer 4 is a colorless and transparent adhesive layer.

The same as the structure of Embodiment 2, the optical function panel of the Embodiment 4 has a main body, the main body comprises a main layer 1 and at least a functional layer 2 combined with main layer 1. The main layer 1 is thicker than functional layer 2, and the main layer 1 is made of transparent material, the main layer 1 and functional layer 2 are made by in-mold coextrusion of extruder. There are two functional layers 2 in this embodiment, which are functional layer 2A and functional layer 2B. The functional layer 2A and functional layer 2B are located on the upper surface and lower surface of main layer 1 respectively. The functional layer 2A and functional layer 2B are made of the same or different materials. The upper surface or/and lower surface of main body are provided with regular or irregular salient structures 3. Differing from Embodiment 2, an optical film layer 5 is stuck on the upper surface of main body in the Embodiment 4 by a UV adhesive layer 4.

The main layer 1, functional layer 2A and functional layer 2B are made by three extruders working simultaneously. The functional layer 2A and functional layer 2B are made of plastic materials with good adhesion and high transmittance property. The basic material of functional layer 2A and functional layer 2B is plastic particles at lower melting point, e.g. PMMA, PS, PC, PP or the corresponding copolymer. One or some of such formulae or functional additives as diffusant/particles, ultraviolet absorbent/particles, brightener and anti-yellowing agent are combined by physical or chemical means, molten to form a thin layer by in-mold extrusion. The thickness of functional layer 2A and functional layer 2B is smaller than 100 μm.

The thickness of main layer 1 is generally larger than 0.3 mm. The main layer 1 is a thin layer made of colorless and transparent plastic material. The main layer 1 is made of one of PMMA, PS, PC, PP and the corresponding copolymer, free of any formulae or additives, the obtainable maximum transmittance property of material is preferred.

The basic materials of main layer 1, functional layer 2A and functional layer 2B are different, the thickness can be adjusted as required. In this embodiment, the functional layer 2A is made of PS material, with or without additives, its thickness is 90 μm. The main layer 1 is made of PP material, its thickness is 0.4 mm. The functional layer 2B is made of PMMA material with additives, its thickness is 90 μm. The optical function panel made of the aforesaid materials will not degrade the concealing property while enhancing the transmittance property.

In addition, in order to further enhance the functionality of optical function panel, the upper and lower surfaces of main body can be provided with salient structures 3. The salient structures 3 are serrated or semicircular or arc bulges in cross section. The serrated or semicircular or arc bulges are distributed uniformly on the upper surface and/or lower surface of main body.

After the light passes through main body, the largest scattering/refraction region concentrates in functional layer 2B, the light scattering path region is shortened, and under the effect of diffusion particles, the degree of light mixing within a short distance is higher, the concealing property is enhanced relatively. Without formulae or additives, the salient structures 3 on the surface of functional layer 2A can gather light to a certain extent, the front brightness is increased. The light is transmitted through the colorless and transparent main layer 1 to the functional layer 2B, the concealing property of end product can be enhanced.

An optical film layer is added to main body, applicable to back light module, the back light module packaging efficiency is increased, and the thickness of back light module is reduced, the cost is reduced to some extent. It can be extensively used in back light and lighting products.

The above only describes some exemplary embodiments of the present invention. Those having ordinary skills in the art may also make many modifications and improvements without departing from the conception of the invention, which shall all fall within the protection scope of the invention.

I claim:

1. An optical function panel having a main body comprising:
    a main layer (1) and at least a functional layer (2) combined with main layer (1), wherein the main layer (1) is thicker than functional layer (2), and the main layer (1) is composed of a transparent material;
    wherein the main layer (1) is a thin layer made of a colorless transparent plastic material and is made of one of poly methyl methacrylate (PMMA), poly-styrene (PS), poly-carbonate (PC), poly-propylene (PP) or a corresponding copolymer thereof;
    wherein the functional layer (2) is provided with two layers respectively disposed on an upper surface and a lower surface of the main layer (1), and the two functional layers (2) are formed of the same or different materials; the basic material of functional layer (2) is plastic particles at lower melting point which is PMMA, PS, PC, PP or the corresponding copolymer, combined with diffusion particles, ultraviolet absorbing particles, brighteners and anti-yellowing agents, are molten to form a thin layer by in-mold extrusion;
    wherein the main layer (1) and the two functional layers (2) arranged on the upper and lower surfaces of the main layer (1) are made in a co-extrusion die of three extruders; and the upper and lower surfaces of the main body are provided with regular salient structures (3); the salient structures (3) are semicircular or arc bulges in cross section; the semicircular or arc bulges are distributed uniformly on the upper surface and lower surface of the main body;
    wherein an upper surface of the main body is bonded to an optical film layer (5) through an ultraviolet rays (UV) adhesive layer (4); the optical film layer (5) is one or some of diffusion film, and the UV adhesive layer is a colorless and transparent adhesive layer.

2. The optical function panel according to claim 1, wherein the main layer (1) has a thickness greater than 0.3 mm, and the functional layer has a thickness of less than 100 μm.

* * * * *